United States Patent
Abotabl et al.

(10) Patent No.: US 12,407,388 B2
(45) Date of Patent: Sep. 2, 2025

(54) MULTIPLE CODEBOOK CHANNEL STATE INFORMATION REPORT PRIORITIZATION

(71) Applicant: QUALCOMM Incorporated, San Diego, CA (US)

(72) Inventors: Ahmed Attia Abotabl, San Diego, CA (US); Yu Zhang, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 17/878,882

(22) Filed: Aug. 1, 2022

(65) Prior Publication Data
US 2024/0039599 A1   Feb. 1, 2024

(51) Int. Cl.
   *H04B 7/06*    (2006.01)
   *H04B 7/0456*  (2017.01)
   *H04L 5/00*    (2006.01)

(52) U.S. Cl.
   CPC ......... *H04B 7/0626* (2013.01); *H04B 7/0456* (2013.01); *H04B 7/063* (2013.01); *H04L 5/0051* (2013.01)

(58) Field of Classification Search
   CPC .... H04B 7/0626; H04B 7/0456; H04B 7/063; H04L 5/0051; H04L 5/0094
   USPC ........................................................ 370/329
   See application file for complete search history.

(56) References Cited

U.S. PATENT DOCUMENTS

| | | | | |
|---|---|---|---|---|
| 2013/0258874 | A1* | 10/2013 | Khoshnevis | H04L 1/0027 370/252 |
| 2014/0177745 | A1* | 6/2014 | Krishnamurthy | H04B 7/063 375/267 |
| 2014/0192918 | A1 | 7/2014 | Park et al. | |
| 2019/0097698 | A1* | 3/2019 | Hosseini | H04B 7/0482 |
| 2019/0109626 | A1* | 4/2019 | Park | H04B 7/0658 |
| 2020/0083937 | A1* | 3/2020 | Rahman | H04B 7/0486 |
| 2022/0053477 | A1 | 2/2022 | Yao et al. | |
| 2024/0250728 | A1* | 7/2024 | Hindy | H04L 5/0023 |

FOREIGN PATENT DOCUMENTS

| | | | | |
|---|---|---|---|---|
| CN | 101605016 | A | * 12/2009 | |
| CN | 111294145 | A | * 6/2020 | ........... H04L 1/0027 |
| CN | 110958040 | B | 5/2021 | |
| WO | WO-2021030956 | A1 | * 2/2021 | |
| WO | 2021159445 | A1 | 8/2021 | |

OTHER PUBLICATIONS

International Search Report and Written Opinion—PCT/US2023/069408—ISA/EPO—Oct. 16, 2023.

* cited by examiner

*Primary Examiner* — Rownak Islam

(74) *Attorney, Agent, or Firm* — Patterson & Sheridan, L.L.P.

(57) ABSTRACT

Certain aspects of the present disclosure provide techniques for multiple codebook channel state information (CSI) report prioritization. A method of wireless communications by a user equipment (UE) includes receiving a CSI report configuration that configures one or more CSI reference signal (CSI-RS) resource sets. Each CSI-RS resource set includes one or more CSI-RS resources. The CSI report configuration also configures a plurality of codebooks for reporting CSI. The method includes receiving a priority order for the plurality of codebooks and reporting CSI based on the CSI report configuration and the priority order.

26 Claims, 14 Drawing Sheets

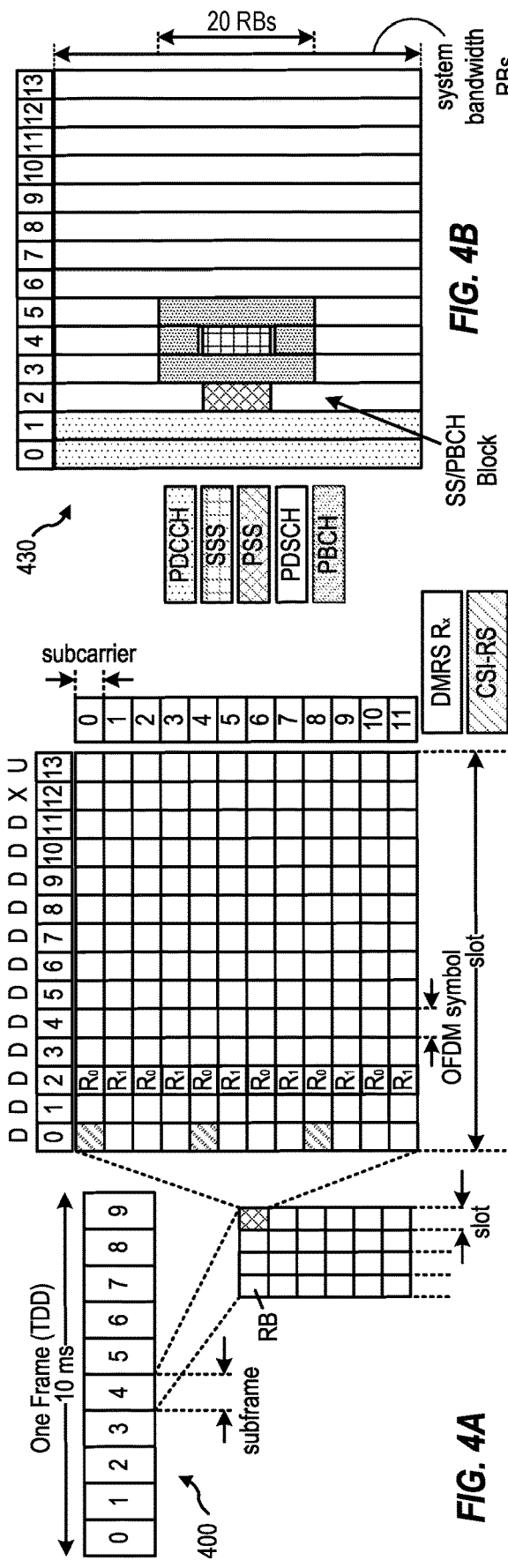
FIG. 4A
FIG. 4B
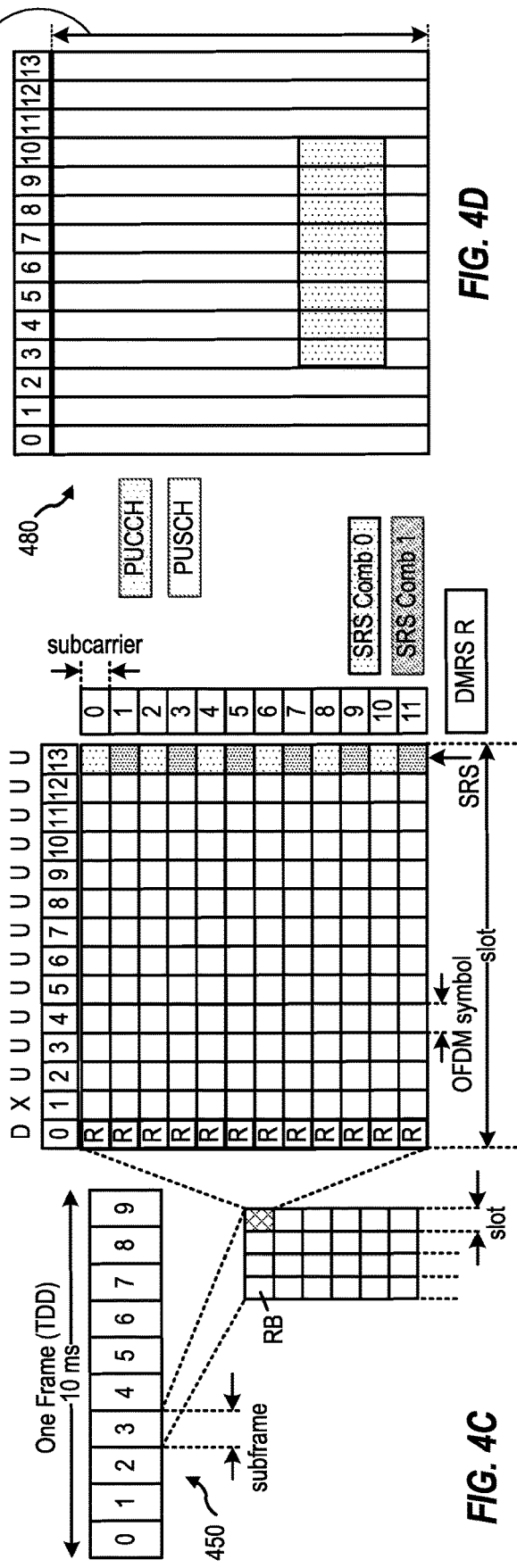
FIG. 4C
FIG. 4D

800A

| Number of CSI-RS antenna ports per resource | (N1, N2) | (O1,O2) |
|---|---|---|
| 4 | (2,1) | (4,1) |
| 8 | (2,2) | (4,4) |
| 8 | (4,1) | (4,1) |
| 12 | (3,2) | (4,4) |
| 12 | (6,1) | (4,1) |
| 16 | (4,2) | (4,4) |
| 16 | (8,1) | (4,1) |
| 24 | (4,3) | (4,4) |
| 24 | (6,2) | (4,4) |
| 24 | (12,1) | (4,1) |
| 32 | (4,4) | (4,4) |
| 32 | (8,2) | (4,4) |
| 32 | (16,1) | (4,1) |

| Number of CSI-RS antenna ports per resource | (Ng, N1, N2) | (O1,O2) |
|---|---|---|
| 4 | (2,2,1) | (4,1) |
| 24 | (2,4,1) | (4,1) |
| 24 | (4,2,1) | (4,1) |
| 24 | (2,2,2) | (4,4) |
| 32 | (2,8,1) | (4,1) |
| 32 | (4,4,1) | (4,1) |
| 32 | (2,4,2) | (4,4) |
| 32 | (4,2,2) | (4,4) |

*FIG. 8B*

MULTIPLE CODEBOOK CHANNEL STATE INFORMATION REPORT PRIORITIZATION

BACKGROUND

Field of the Disclosure

Aspects of the present disclosure relate to wireless communications, and more particularly, to techniques for channel state information (CSI) reporting.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving a CSI report configuration that configures one or more CSI reference signal (CSI-RS) resource sets. Each CSI-RS resource set includes one or more CSI-RS resources. The CSI report configuration configures a plurality of codebooks for reporting CSI. The method includes receiving a priority order for the plurality of codebooks. The method includes reporting CSI based on the CSI report configuration and the priority order.

Another aspect provides a method for wireless communication by a network entity. The method includes outputting a CSI report configuration that configures a UE with one or more CSI-RS resource sets. Each CSI-RS resource set includes one or more CSI-RS resources. The CSI report configuration also configures the UE with a plurality of codebooks for reporting CSI. The method includes outputting a priority order for the plurality of codebooks. The method includes obtaining a CSI report from the UE based on the CSI report configuration and the priority order.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIG. 8A is a table depicting an example of supported antenna and antenna port configurations for single panel.

FIG. 8B is a table depicting an example of supported antenna and antenna port configurations for multiple panels panel.

DETAILED DESCRIPTION

Figure 1:
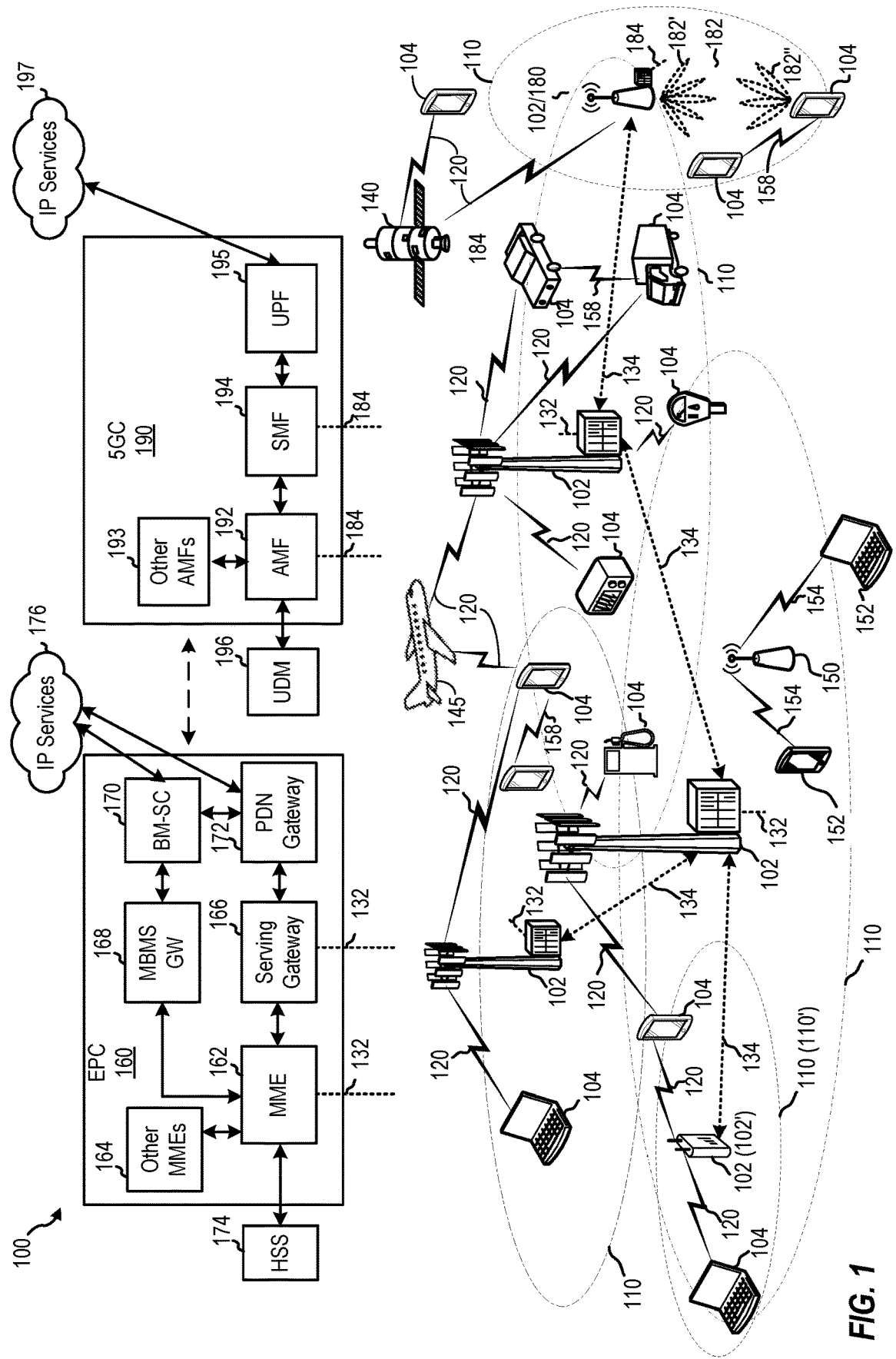
FIG. 1 depicts an example wireless communications network.

Aspects of the present disclosure provide apparatuses, methods, processing systems, and computer-readable mediums for CSI report prioritization.

In a wireless communication network, network energy savings may be configured to reduce power consumption and costs of running the network. With network energy savings, the network may dynamically change the number of active antenna ports to balance traffic needs and energy savings. Thus, a UE may be configured with multiple codebooks associated with different numbers of CSI-RS antenna ports. However, when the UE is configured with multiple codebooks, the UE may report wideband and subband CSI feedback for the multiple codebooks. A physical uplink control channel (PUCCH) resource for reporting the CSI may be insufficient to carry the CSI bits for the multiple codebooks.

Accordingly, aspects of the disclosure provide CSI report prioritization for CSI reporting for multiple codebooks. In some aspects, when the PUCCH resource is insufficient to fit the CSI bits for the multiple codebooks, the UE determines one or more of the codebooks to drop the CSI feedback. In some aspects, the UE determines a priority order of the codebooks and drops the one or more codebooks based on the priority. In some examples, the UE receives the priority order from the network.

In some examples, the UE receives an indication of a primary codebook, from the network, and determines the remaining codebooks as secondary codebooks. In some aspects, the UE determines the primary codebook has a highest priority and the secondary codebooks have a lower priority.

In some aspects, the UE determines the relative priorities of the secondary codebooks. For example, the UE may determine the relative priority of the secondary codebooks based on a priority order of multiple codebooks received from the network entity, but determines the primary codebook as having the highest priority regardless of the priority order. In some examples, the UE receives a different priority order of secondary codebooks for each codebook as the primary codebook.

In some aspects, the UE is configured or preconfigured with a priority order rule. The priority rule may specify codebook having a higher number of CSI-RS antenna ports have a higher priority than codebooks having a lower number of CSI-RS antenna ports.

In some examples, the priority of a codebook is based on whether the codebook is for wideband or subband CSI.

Accordingly, a UE can be configured with multiple codebooks so that network can dynamically adapt the link, and the UE can determine the prioritization order of the multiple codebooks for CSI reporting.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
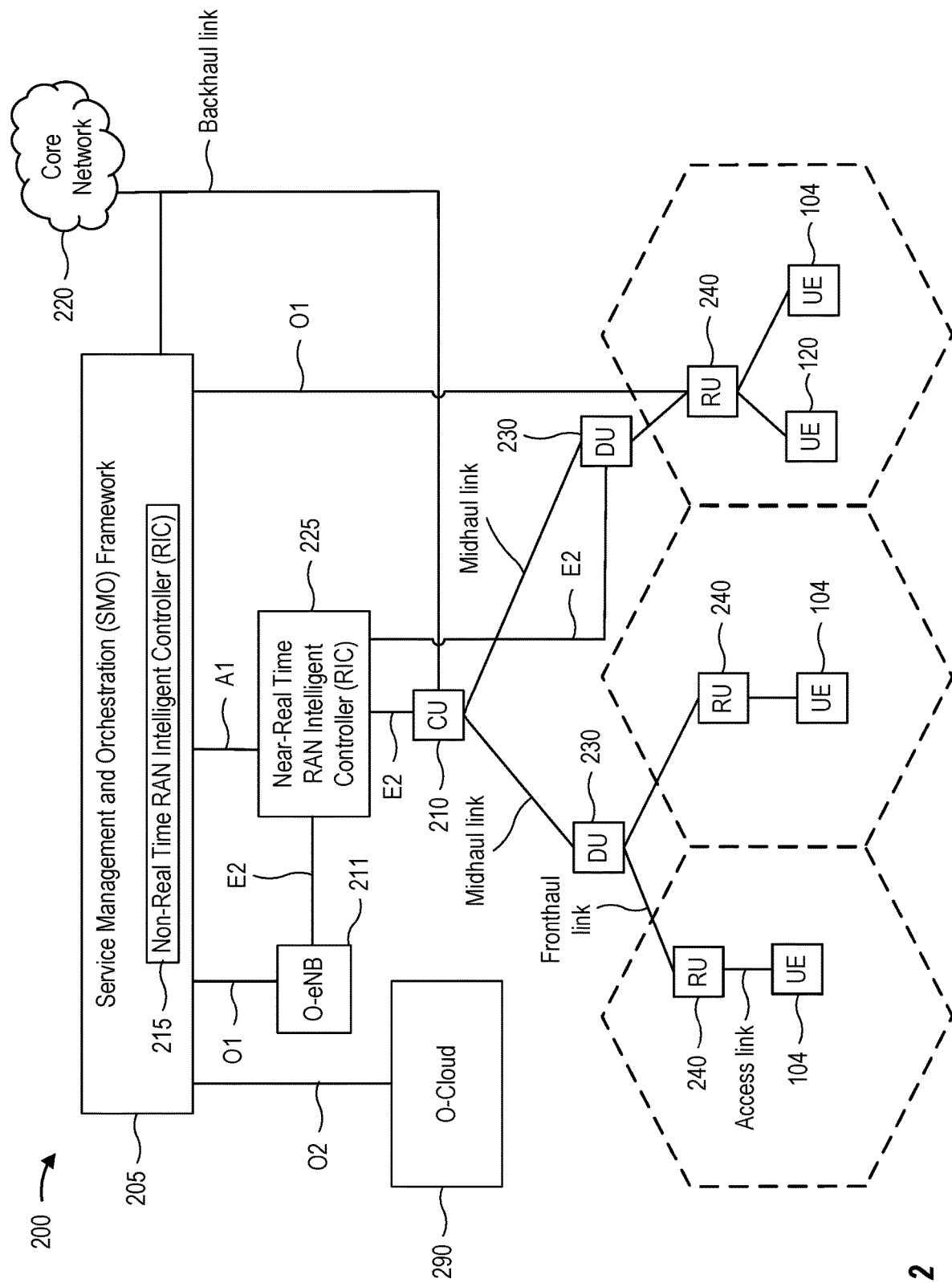
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
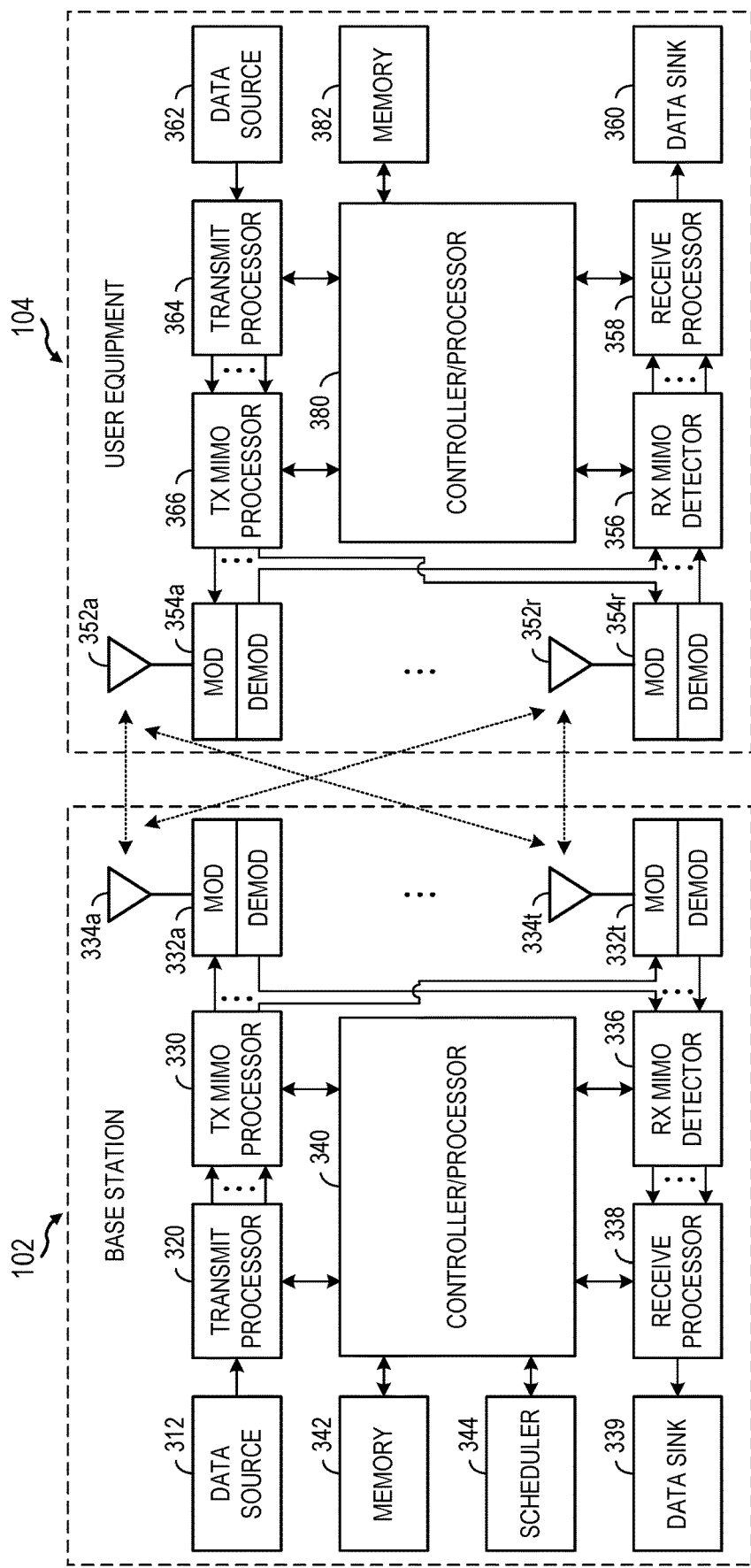
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a-332t*. Each modulator in transceivers 332*a-332t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a-332t* may be transmitted via the antennas 334*a-334t*, respectively.

In order to receive the downlink transmission, UE 104 includes antennas 352*a-352r* that may receive the downlink signals from the BS 102 and may provide received signals to the demodulators (DEMODs) in transceivers 354*a-354r*, respectively. Each demodulator in transceivers 354*a-354r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a-354r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a-354r* (e.g., for SC-FDM), and transmitted to BS 102.

At BS 102, the uplink signals from UE 104 may be received by antennas 334*a-t*, processed by the demodulators in transceivers 332*a-332t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Network Energy Consumption

In certain wireless communication networks (e.g., such as wireless communication network 100 illustrated in FIG. 1), network energy savings is employed to reduce energy consumption in the network.

In certain wireless communication networks, energy costs to run the network are a significant portion (e.g., around 25%) of the total costs of running the network. Of the energy costs, a large portion (e.g., around 50% in 5G NR) of the energy costs may be to run the RAN. With 5G massive MIMO, the energy costs due to power consumption of active antenna units (AAUs) increases two-fold to three-fold as compared to 4G technologies. Accordingly, energy savings are desired for adoption and expansion of such networks.

Network energy savings have been proposed to reduce/conserve the power consumption of networks. With network energy savings, the network may be adaptive in order to conserve energy when possible. Network energy savings may consider factors including power amplifier efficiency, the number of transceivers, traffic loading in conserving energy by performing approaches such as downlink/uplink sleep states, sleep states transition times, and other parameters and configurations. Such network energy savings may be balanced with impact to the network and user performance (e.g., spectral efficiency, capacity, user perceived throughput (UPT), latency, handover performance, call drop rate, initial access performance, service level agreement (SLA) assurance related kay performance indicators (KPIs), energy efficiency, UE power consumption, and/or complexity).

Aspects Related to Dynamic Antenna Port Adaptation

Figure 5A:
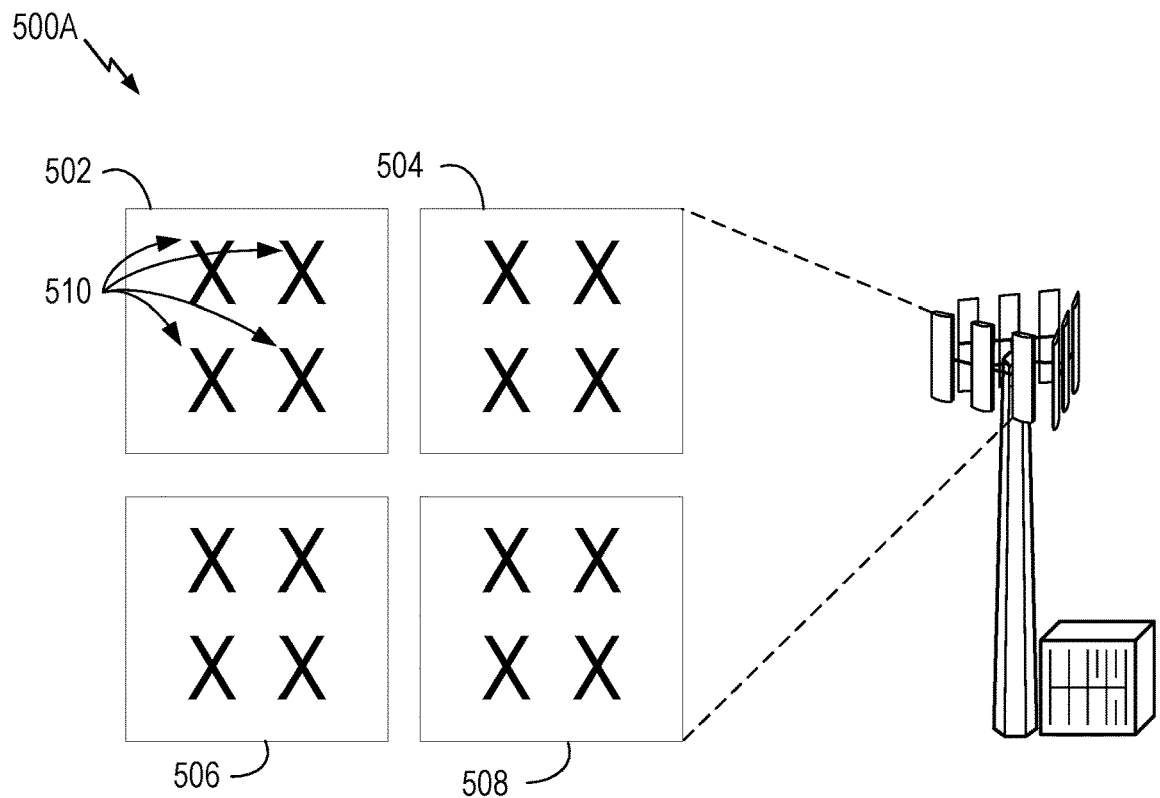
FIG. 5A depicts an example network antenna port configuration.

One approach for network energy savings is dynamic antenna port adaptation of network entity (e.g., a gNB) antenna ports. In massive MIMO, the network entity may have multiple co-located antenna panels. Each antenna panel may include multiple antenna ports. FIG. 5A illustrates an example network entity antenna panel configuration 500A. As shown, the network entity has multiple co-located antenna panels 502, 504, 506, and 508. Each of the antennas panels includes multiple antenna ports 510. It should be understood that while FIG. 5A illustrates four antenna panels and each antenna panel having four antenna ports, a network entity antenna panel configuration may include any number of antenna panels having any number of antenna ports.

Figure 5B:
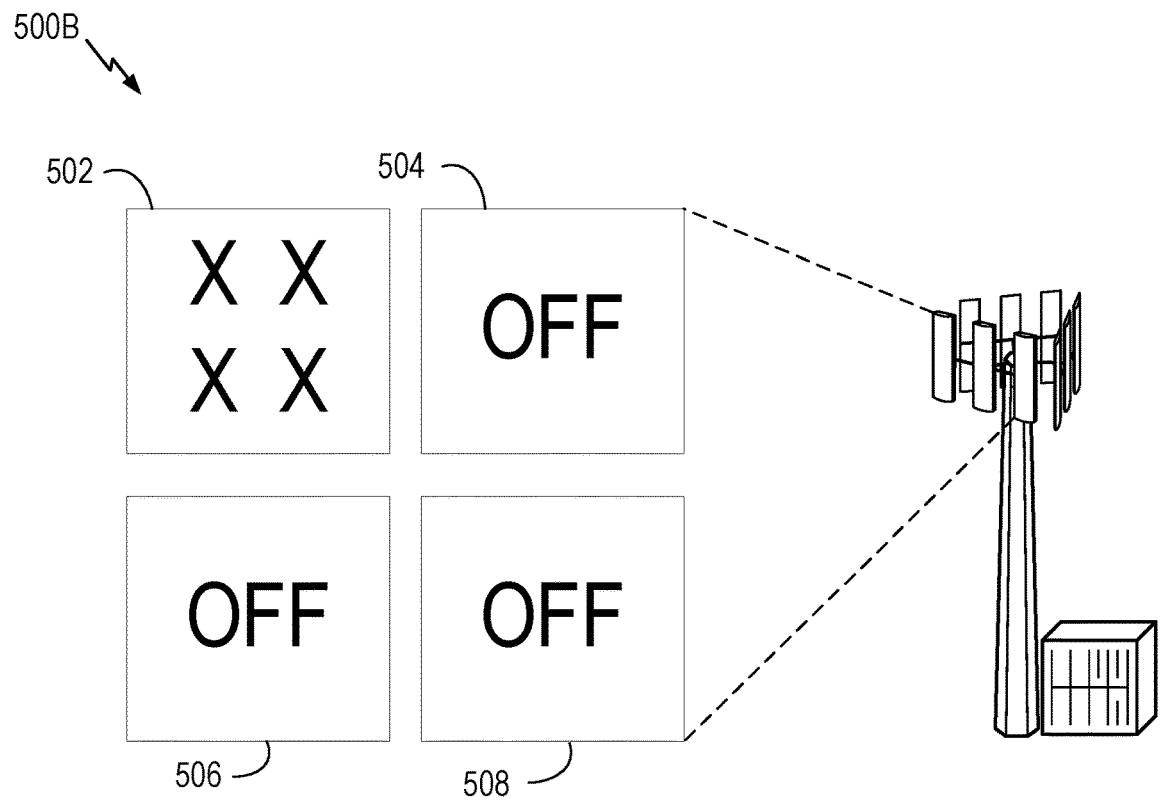
FIG. 5B depicts an example adapted network antenna port configuration.

Each of the antennas panels may be equipped with multiple power amplifiers and antenna subsystem components, which consume power. With network energy savings, the network may dynamically turn off some of the panels, as shown in FIG. 5B, subpanels (not shown), or antenna ports (not shown). FIG. 5B illustrates an example adapted network entity antenna panel configuration 500B. As shown, the antenna panels 504, 506, and 508 are turned off by the network to conserve power and reduce costs. For example, the antenna panels may be turned off when the cell load is low (e.g., below a threshold level).

Aspects Related to CSI Reporting

Channel state information refers to channel properties of a communication link. The CSI may represent the combined effects of, for example, scattering, fading, and, and power decay with distance between a transmitter and receiver. A UE (e.g., such as a UE 104 illustrated in FIGS. 1 and 3) may perform channel estimation using pilots, such as CSI-RS to determine these effects on a channel between the UE and network entity (e.g., a BS 102 illustrated in FIGS. 1 and 3). The CSI may be used to adapt transmissions based on the current channel conditions, which is useful for achieving reliable communication, in particular, with high data rates in multi-antenna systems. CSI may be estimated at the receiver (e.g., the UE), quantized, and fed back to the transmitter (e.g., the BS).

Figure 6:
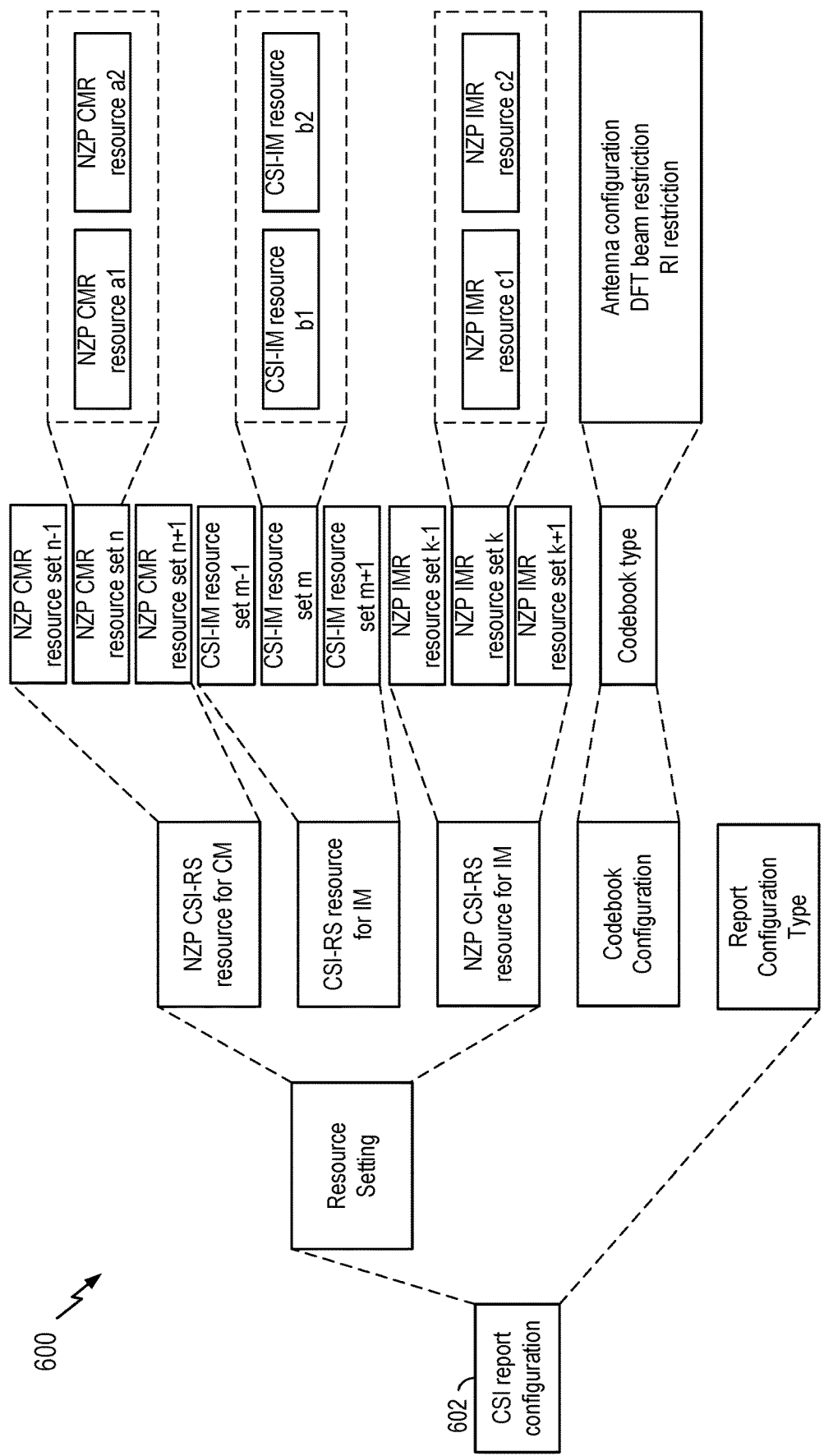
FIG. 6 illustrates an example CSI report configuration.

The network (e.g., a BS), may configure UEs for CSI reporting. For example, the BS configures the UE with a CSI report configuration or with multiple CSI report configurations. The CSI report configuration may be provided to the UE via higher layer signaling, such as radio resource control (RRC) signaling (e.g., a CSI-ReportConfig IE with reporting settings). FIG. 6 illustrates an example CSI report configuration 602.

The CSI report settings may be associated with CSI-RS resources for channel measurement (CM), interference measurement (IM), or both. The CSI report configuration configures CSI-RS resources for measurement. The CSI-RS resources may be provided to the UE via higher layer signaling, such as RRC signaling (e.g., a CSI-ResourceConfig IE with resource settings). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM. As shown, the CSI report configuration 602 configures n NZP CMR resource sets; m CSI-IM resource sets, and k NZP IMR resource sets. Each NZP CMR resource set includes a set of a NZP CMR resources. Each CSI IM resource set includes a set of b CSI-IM resources. Each NZP IMR resource set includes c NZP IMR resources. On CSI-IM resources, other signals designated to the UE may be muted so interference can be measured directly. In an NZP IMR, the channel may be estimated based on the CSI-RS is included in the assumed interference.

In some examples, each resource in a resource set includes the same number of CSI-RS ports. In some examples, a resource set including one resource may include up to 32 CSI-RS ports in the resource; a resource set including two resources may include up to 16 CSI-RS ports per resource; and a resource set including more than two resources may include up to 8 CSI-RS ports per resource.

The CSI report configuration may also be associated with trigger states. The UU may be configured by higher signaling, such as RRC signaling, with one or more lists of trigger states (e.g., a CSI-AperiodicTriggerStateList and CSI-SemiPersistentOn PUSCH-TriggerStateList). Each trigger state may include a list of one or more associated CSI report configurations.

The CSI report configuration also configures the CSI parameters (e.g., in a report quantities parameter). CSI may include channel quality indicator (CQI), precoding matrix indicator (PMI), CSI-RS resource indicator (CRI), SS/PBCH block resource indicator (SSBRI), layer indicator (LI), rank indicator (RI), L1-RSRP, and/or a capability set index.

Figure 7:
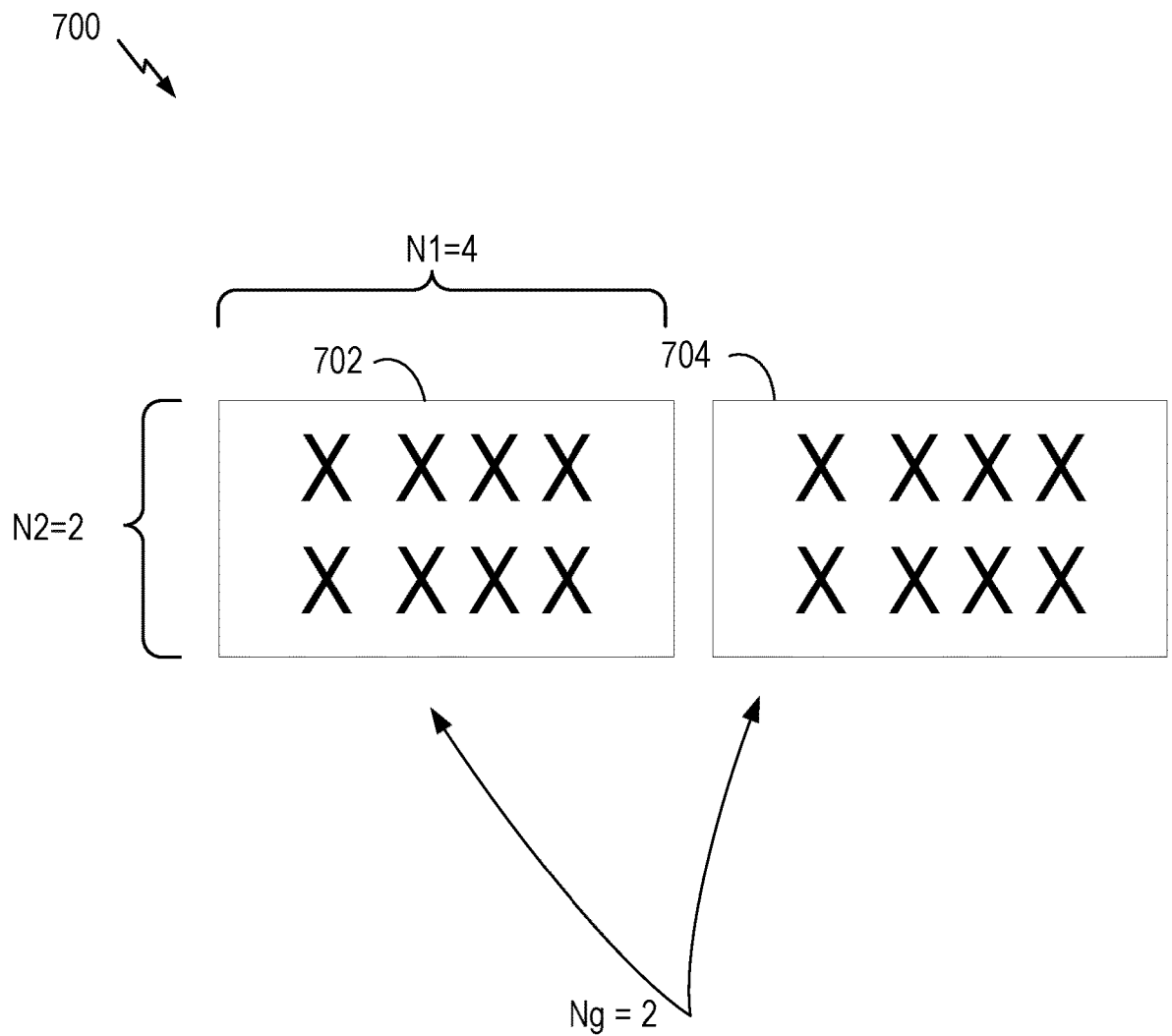
FIG. 7 illustrates an example antenna configuration.

The UE CSI report configuration may configure a codebook. Type I single panel codebook, a Type I multi-panel codebook a Type II single panel codebook, a Type II port selection codebook, and/or a Type II enhanced port selection codebook. The structure of the PMI may vary based on the codebook. As shown, the CSI report configuration 602 includes a codebook configuration that configures the codebook type. A codebook is a set of precoders, referred to as a precoding matrix. The set of precoders are used to transform data bits to another set of data that maps to antenna ports. The codebook type may indicate an antenna configuration, a discrete Fourier transform (DFT) beam restriction, and/or an RI restriction. The antenna configuration may configure the antenna element configuration (N1, N2) and number of panels (Ng) for each codebook type and a corresponding number of CSI-RS antenna ports per resource (e.g., 2Ng*N1*N2). N1 is the number of horizontal antenna elements of a panel and N2 is a number of vertical antenna elements in the panel. FIG. 7 illustrates an example antenna configuration with Ng=2, N1=4, and N2=2, where panels 702 and 702 include two rows of four antenna elements.

FIG. 8A is a table depicting an example of supported antenna and antenna port configurations for single panel. FIG. 8B is a table depicting an example of supported antenna and antenna port configurations for multiple panels panel. O1 and O2 are DFT oversampling parameters used to determine beam sweeping in the horizontal and vertical directions, respectively.

The CSI report configuration may configure the UE for aperiodic, periodic, or semi-persistent CSI reporting. For periodic CSI, the UE may be configured with periodic CSI-RS resources. Periodic CSI and semi-persistent CSI report on PUCCH may be triggered via RRC or a medium access control (MAC) control element (CE). For aperiodic and semi-persistent CSI on the PUSCH, the network may signal the UE a CSI report trigger indicating for the UE to send a CSI report for one or more CSI-RS resources, or configuring the CSI-RS report trigger state (e.g., CSI-AperiodicTriggerStateList and CSI-SemiPersistentOnPUSCH-TriggerStateList). The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource.

The UE may report the CSI feedback based on the CSI report configuration and the CSI report trigger. For example, the UE may measure the channel associated with CSI for the triggered CSI-RS resources. Based on the measurements, the UE may select a CSI-RS resource. The UE reports the CSI feedback for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

For Type I, only single-slot reporting may be done. The CSI report may include a Part 1 CSI report with RI/CRI and CQI for the first codeword and the Part 2 of the CSI report may include PMI and CQI for the second codeword (e.g., when RI>4). The CSI report may be carried on a short PUCCH and/or PUSCH and/or a long PUCCH and/or PUSCH. Subband CSI may be carried on PUSCH and/or long PUCCH.

For Type II, the Part 1 of the CSI report may include RI, CQI and an indication of the number of non-zero wideband amplitude coefficients per layer. The Part 1 of the CSI report may have a fixed size and each field may be encoded separately. The Part 1 of the CSI report may be used to identify the number of bits of the Part 2 of the CSI report. The Part 2 of the CSI report may include PMI corresponding to indicated non-zero wideband amplitude coefficients per layer in the Part 1 of the CSI report. CSI reports on long PUCCH and on PUSCH may be calculated independently. Whether a UE can be configured with Type II CSI reports on both long PUCCH and PUSCH is a UE capability. L1-RSRP and resource indicators for beam management may be mapped to Part 1 when reported on long PUCCH or PUSCH.

A CSI report configuration may be configured per bandwidth part (BWP). Each CSI report configuration may be associated with a single downlink BWP. The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE.

Each CSI resource setting may be located in the DL BWP identified by the higher layer parameter, and all CSI resource settings may be linked to a CSI report setting have the same DL BWP.

Aspects Related to Link Adaptation and CSI Reporting

Figure 9:
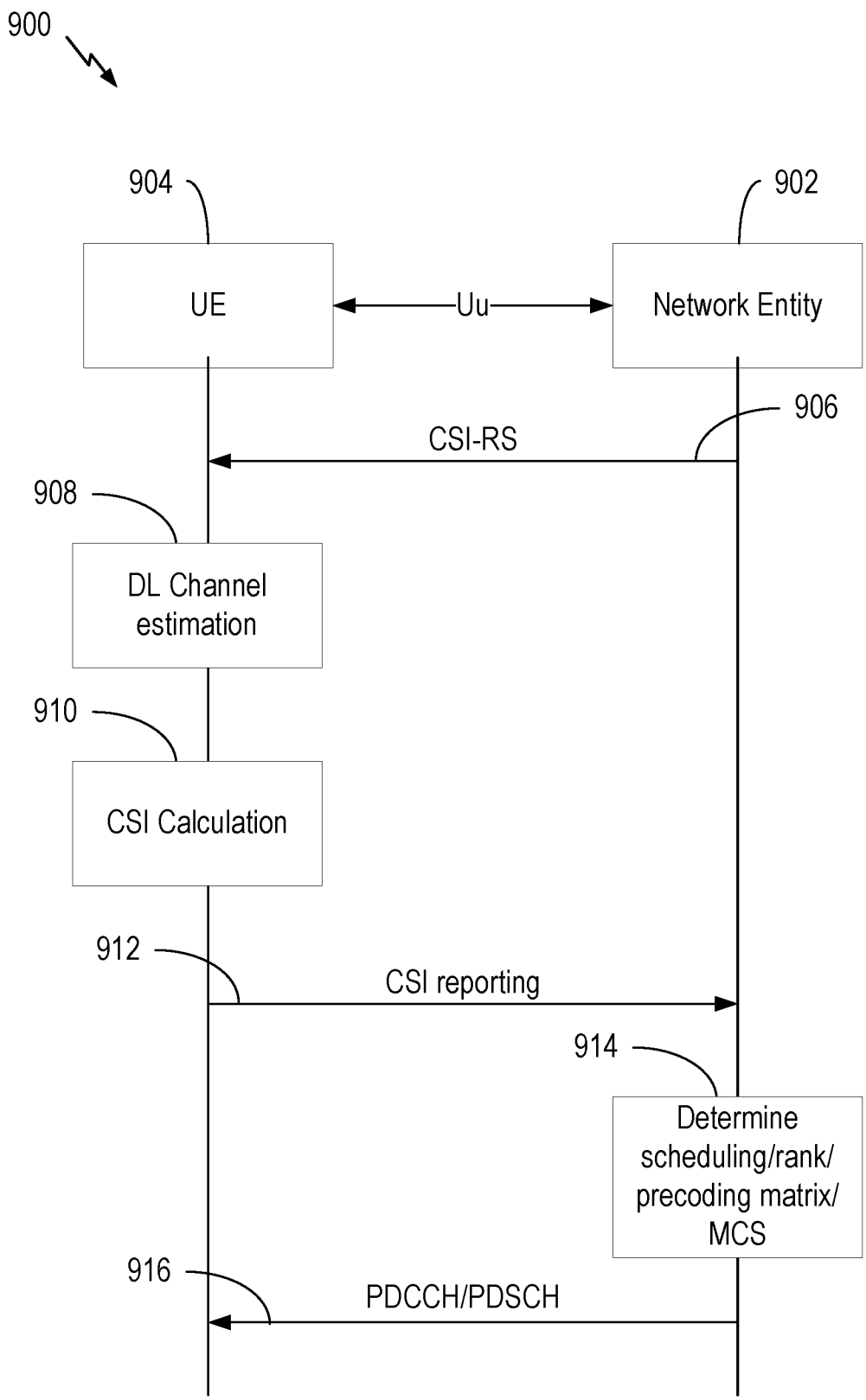
FIG. 9 depicts an example process flow for CSI reporting and link adaptation.

FIG. 9 depicts an example process flow 900 for CSI reporting and link adaptation. As shown, a network entity 902 (e.g., such as a BS 102 depicted and described with respect to FIG. 1 and FIG. 3) transmits CSI-RS to UE 904 (e.g., such as a UE 104 depicted and described with respect to FIG. 1 and FIG. 3) at 906. The CSI-RS may be transmitted using $M_T$ CSI-RS ports.

At 908, the UE 904 performs downlink channel estimation. In some examples, the UE 904 monitors and receives the CSI-RS and performs the downlink channel estimation based on a CSI report configuration. For example, the UE 904 may estimate (H) $M_R \times M_T$.

At 910, the UE 904 calculates CSI, including RI, PMI, and CQI. At 912, the UE 904 reports the CSI to the network entity 902.

At 914, the network entity 902 determines scheduling, rank, precoding matrix, and a modulation and coding scheme (MCS). From rank-1 to rank-R, the precoder and rank selection for a given codebook may be given by $\{\{P_1(0), \ldots, P_1(L_1-1)\}, \ldots, \{P_R(0), \ldots, P_R(L_R-1)\}\}$. The spectral efficiency for H and $P_r(i)$ may be determined $SE_{est}(H, P_r(i))$. The CQI calculation may be conditioned on an optimal rank, $R^*$, and precoder, $P_R^*(i^*)$: $(R^*, i)=\arg\max_{r,i} SE_{est}(H, P_r(i))$ and $CQI^*=f(SE_{est}(H, P_R(i^*)))$.

At 916, the network entity 902 sends PDCCH and/or PDSCH according to the determined scheduling, rank, precoding matrix, and/or MCS.

Aspects Related to Multiple Codebook CSI Reporting

In some cases, a CSI report configuration (e.g., such as CSI report configuration 602) includes a codebook configuration that configures multiple codebooks, such as any of the codebook configurations in the tables 800A and 800B illustrated in FIGS. 8A-8B. Each of the codebooks may be associated with an antenna port configuration (N1, N2) or (Ng, N1, N2), beam restriction, and RI restriction. In an illustrative example, the codebook configuration may indicate a first codebook configuration (N1, N2)=(4,4) with a first beam restriction and RI restriction, a second codebook configuration (N1, N2)=(2,1) with a second beam restriction and RI restriction, a third codebook configuration (N1, N2)=(2,2) with a third beam restriction and RI restriction, and a fourth codebook configuration (N1, N2)=(4,2) with a fourth beam restriction and RI restriction. In some examples, the resource for CSI measurement may be shared among the codebook configurations.

With multiple codebooks configured, the UE (e.g., such as a UE 104 depicted and described with respect to FIG. 1 and FIG. 3) may send a CSI report to the network (e.g., such as a BS 102 depicted and described with respect to FIG. 1 and FIG. 3) with CSI associated with a subset of codebooks. For example, the UE computes CSI for each of the configured codebooks. The UE may sort the CSI based on one or more factors, such as spectral efficiency. The UE may report a subset of one or more of the best CSIs in the CSI report.

As discussed above, with a network energy savings configuration, the network may dynamically change the number of antenna ports to accommodate the traffic and save energy. With the multiple configured codebooks, the UE can report CSI based on a subset of the codebooks depending on the number of antenna ports. In some examples, the network entity receiving the CSI may consider one of the codebooks as a primary codebook and one or more of the other codebook as secondary. In some examples, the primary codebook is associated with a current network antenna configuration and the secondary codebooks are associated with different network antenna configurations that the network may use for dynamic link adaptation.

The UE may be configured to report wideband CQI and subband CQI for each of the codebook, may result in a large report size. In some cases, the PUCCH resources available to the UE may not be sufficient to carry the bits for reporting the CSI.

Aspects of the present disclosure provide prioritization for reporting CSI when a UE is configured to report CSI-RS with multiple codebook. For example, a CodebookConfig parameter in a CSI-ReportConfig IE indicates multiple codebooks.

According certain aspects, a CSI-RS report configuration that configures multiple codebooks can be configured as multiple different CSI-RS report configurations with different codebooks. The different CSI-RS report configurations with the different codebooks can be configured in an order. A priority for each of the different CSI-RS report configurations may be implicitly defined depending on the CSI-RS report configuration order.

According to certain aspects, a CSI-RS report configuration that configures multiple codebooks can be configured by a single CSI-RS report configuration. Accordingly, the UE and the network need to determine the prioritization of the reporting the multiple codebooks. In addition, the priority of the different codebooks may change depending on the current network operation. According to certain aspects, the priority of different codebooks can be dynamically determined by the network depending on the load.

The UE may use the prioritization of the codebooks to determine whether to drop or send CSI associated with the codebook. For example, the UE may determine that a PUCCH resource is insufficient to carry all of the bits for reporting the CSI for all of the multiple configured codebooks. In this cases, the UE may drop the CSI according to the respective priority of the respective codebooks According to certain aspects, when the UE is configured with a CSI report configuration that configures multiple codebooks, the UE is also configured with a prioritization order for the multiple codebooks. For example, the UE may be RRC configured with the prioritization order for the multiple codebook. In some examples, the codebook prioritization order is configured in the CSI report configuration. In some examples, the codebook prioritization order is configured separately from the CSI report configuration. In some examples, the prioritization order is configured explicitly. In an illustrative example, the CSI report configuration configures four codebooks, codebook A (e.g., a 32 port antenna configuration), codebook B (e.g., an 8 port antenna configuration), codebook C (e.g., a 16 port antenna configuration), and codebook D (e.g., a 4 port antenna configuration), and a priority order from high to low of the codebooks, codebook A, codebook B, codebook C, and codebook D.

According to certain aspects, when the UE is configured with a CSI report configuration that configures multiple codebooks, the network further indicates one of the codebooks as a primary codebook and the other codebooks as secondary codebooks.

In some aspects, the network explicitly indicates one of the plurality of codebooks as the primary codebook and the UE determines that the remainder of the plurality of codebooks are secondary codebooks. In some examples, the UE determines or the network indicates to the UE, that the primary codebook is of a higher priority than the secondary codebooks. In some examples, when the UE decides to drop CSI associated with one of the secondary codebooks, the UE drop the CSI associated with all of the secondary codebooks.

In some aspects, the network explicitly indicates one of the plurality of codebooks as the primary codebook and indicates a priority order for the remaining secondary codebook. In some examples, the network configures a priority order of the plurality of codebooks. In this example, the UE determines the primary codebook as the highest priority codebook, regardless of the primary codebooks order in the configured priority order, and the UE determines the remainder of the secondary codebook according to the configured priority order. In some examples, the network configures multiple priority orders for the multiple codebooks. For example, the network configures a different priority of the secondary codebooks for each of the multiple codebooks as the primary codebook.

In some aspects, the UE is configured or preconfigured with a rule for determining the priority order. In some examples, the priority order rule is RRC configured at the UE. In some examples, the rule is included in the CSI report configuration. In some examples, the priority order rule is used to determine the priority order of the multiple codebooks. In some examples, the priority order rule is used to determine the priority order of the secondary codebooks.

In some examples, the priority order rule specifies that the priority order is based on the relative number of CSI-RS antenna ports associated with the codebook. For example, the priority order rule may indicate that codebooks associated with larger numbers of antenna ports have higher priority than codebooks associated with fewer numbers of antenna ports. In some examples, where a primary codebook is indicated, the UE determines the primary codebook has a highest priority, regardless of the number of CSI-RS antenna ports associated with the primary codebook, and determines the priority of the remaining secondary codebooks based on the respective numbers of CSI-RS antenna ports associated with the respective secondary codebook.

In some cases, wideband CSI may have different priority than subband CSI. In some examples, a CSI report configuration that configures multiple codebooks may configure a codebook for wideband CSI and another codebook for subband CSI. According to certain aspects, the priority order may be based on whether the codebook is associated with wideband CSI or subband CSI. In some examples, the priority order for a given codebook may be different based on whether the codebook is configured for wideband or subband CSI. In an illustrative example, a priority order, from highest to lowest priority, is a 32 port codebook for wideband CSI; a 16 port codebook for wideband CSI; a 32 port codebook for subband CSI; an 8 port codebook for wideband CSI; a 16 port codebook for subband CSI; and an 8 port codebook for subband CSI.

In some examples, with the RRC (e.g., semi-statically) configured priority order of the multiple codebooks, when the network dynamically changes/adapts the current CSI-RS antenna port configuration, the UE can automatically re-determine the priority order for the CSI reporting.

In some examples, in addition to determining the priority order of the multiple codebooks in a CSI report configuration, the UE can determine a relative priority of codebooks configured by different CSI report configurations.

Example Operations of Entities in a Communications Network

Figure 10:
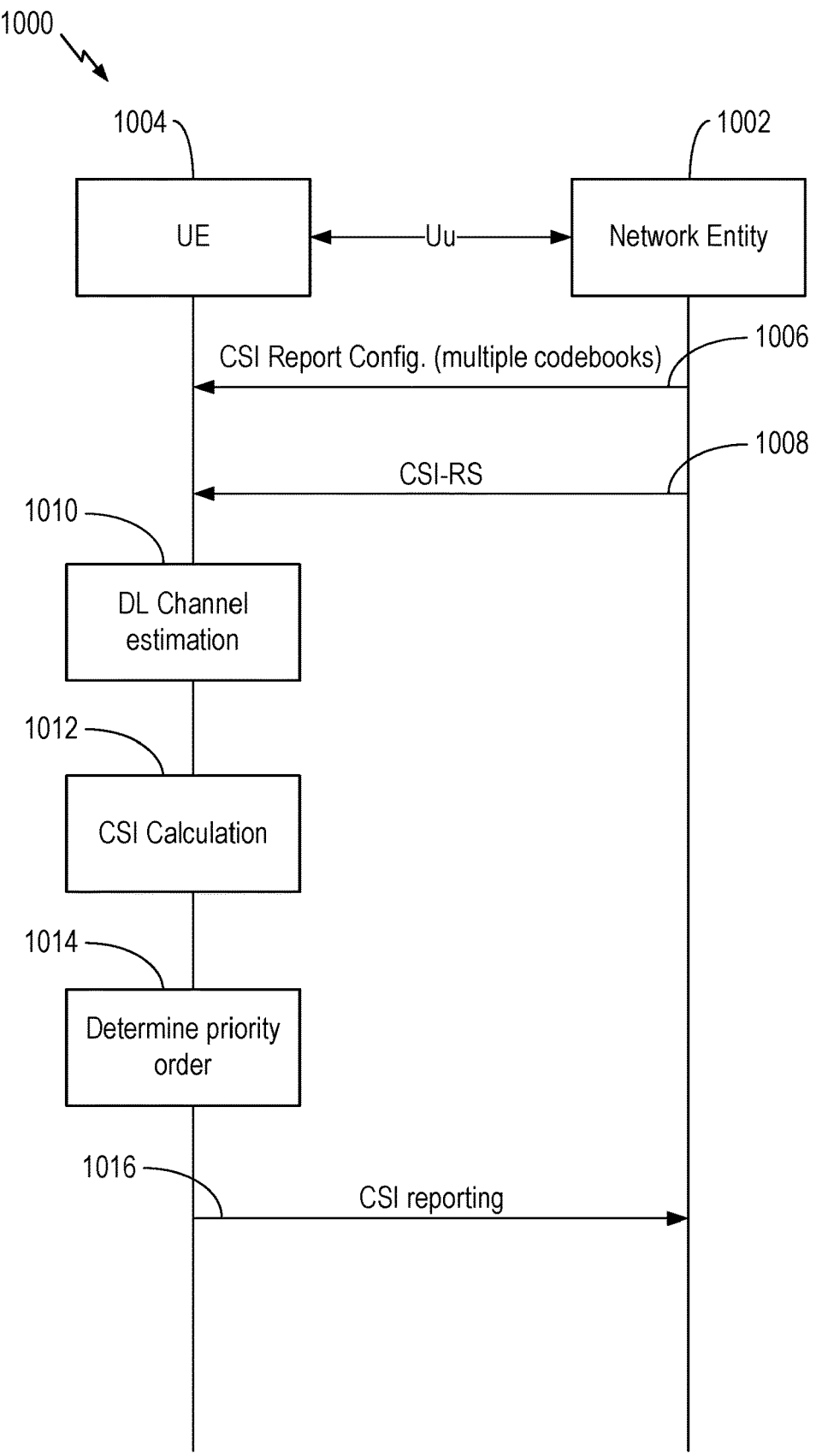
FIG. 10 depicts an example process flow for communications in a network between a network entity and a UE.

FIG. 10 depicts a process flow 1000 for communications in a network between a network entity 1002, a user equipment (UE) 1004, and [other entities depicted]. In some aspects, the network entity 1002 may be an example of the BS 102 depicted and described with respect to FIGS. 1 and 3 or a disaggregated base station depicted and described with respect to FIG. 2. Similarly, the UE 1004 may be an example of UE 104 depicted and described with respect to FIGS. 1 and 3. However, in other aspects, UE 1004 may be another type of wireless communications device and the network entity 1002 may be another type of network entity or network node, such as those described herein.

As shown, at 1006, the network entity 1002 may send a CSI report configuration (e.g., such as CSI report configuration 602) to the UE 1004. The CSI report configuration configures multiple codebooks. As described above, the CSI report configuration may be configured by RRC signaling.

At 1008, the network entity 1002 sends CSI-RS to the UE 1004. The CSI-RS may be based on the CSI report configuration. In some examples, the network entity 1003 sends (now shown) a downlink control information (DCI) and/or medium access control control element (MAC-CE) triggering the CSI-RS before sending the CSI-RS at 1008.

At 1010, the UE 1004 performs downlink channel estimation based on the CSI-RS received at 1008.

At 1012, the UE 1004 performs CSI calculation based on the channel estimation at 1010.

At 1014, the UE 1004 determines a priority order of the multiple codebooks configured by the CSI report configuration received at 1006. In some examples, the UE 1004 receives the priority order from the network entity 1002. The UE 1004 may receive the priority order from the network entity 1002 in the CSI report configuration at 1006. In some examples, the UE 1004 receives an explicit indication of the priority order. In some examples, the UE 1004 receives an indication of a primary codebook of the multiple codebook. In some examples, the UE 1004 receives an explicit priority order of the remaining secondary codebooks. In some examples, the UE 1004 receives a separate priority order of secondary codebooks for each codebook as the primary codebook. In some examples, the UE 1004 determines the priority order based on a priority order rule. The priority order rule may be configured (e.g., via RRC with the CSI report configuration or separately) or preconfigured (e.g., hardcoded or specified in a wireless standard). For example, the rule may specify that codebooks associated with a higher number of CSI-RS antenna ports have a higher priority than codebooks associated with a lower number of CSI-RS antenna ports. In some examples, the priority order a codebook is based on whether the codebook is for wideband CSI or subband CSI.

At 1016, the UE 1004 reports CSI to the network entity 1002 based on the CSI calculation at 1012 and the priority order determined at 1014. In some examples, the UE 1004 determines that a PUCCH resource is insufficient to transmit CSI for the multiple codebooks configured by the CSI report configuration at 1006. In this case, the UE 1004 drops one or more codebooks based on the priority order. For example, the UE 1004 may drop CSI associated with one or more lowest priority codebooks until the remaining CSI is fits in the PUCCH resource. In some examples, the UE 1004 drops the CSI associated with all of the secondary codebooks.

Example Operations of a User Equipment

Figure 11:
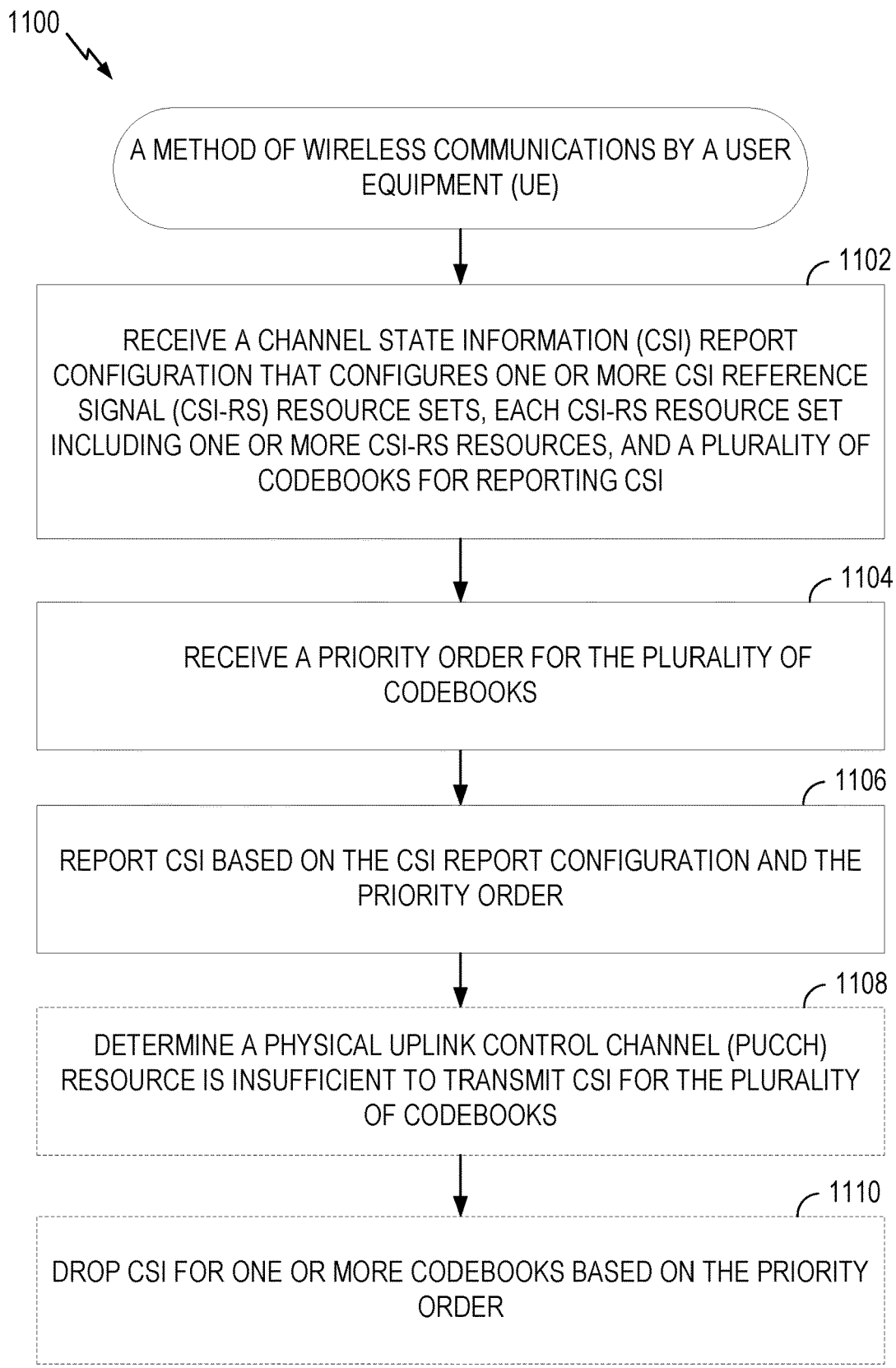
FIG. 11 depicts an example method for wireless communications by a UE.

FIG. 11 shows a method 1100 for wireless communications by a UE, such as UE 104 of FIGS. 1 and 3.

Method 1100 begins at 1102 with receiving a CSI report configuration that configures one or more CSI-RS resource sets. Each CSI-RS resource set includes one or more CSI-RS resources. The CSI report configuration also configures a plurality of codebooks for reporting CSI.

In one aspect, each codebook of the plurality of codebooks indicates one or more of: a number of CSI-RS antenna ports per CSI-RS resource, a number of antenna panels, a number of horizontal antenna elements of an antenna panel, a number of vertical antenna elements of an antenna panel, or a combination thereof.

Method 1100 then proceeds to step 1104 with receiving a priority order for the plurality of codebooks.

In one aspect, receiving the priority order, at 1104, includes receiving the priority order via RRC signaling.

In one aspect, receiving the priority order, at 1104, includes receiving the priority order with the CSI report configuration.

In one aspect, receiving the priority order, at 1104, includes receiving an explicit indication of a priority level of each of the plurality of codebooks.

In one aspect, receiving the priority order, at 1104, includes receiving an indication of one of the plurality of codebooks as a primary codebook.

In one aspect, method 1100 further includes determining the other codebooks of the plurality of codebooks as secondary codebooks and determining the primary codebook is associated with a higher priority than the secondary codebooks.

In one aspect, receiving the priority order, at 1104, further includes receiving a priority order of the secondary codebooks.

In one aspect, receiving the priority order of the secondary codebooks, at 1104, includes receiving a configuration of a priority order of the plurality of codebooks; determining the primary codebook as a highest priority codebook regardless of the configuration of the priority order; and determining the priority of the second codebooks according to the configuration of the priority order.

In one aspect, receiving the priority order of the secondary codebooks, at 1104, includes receiving a plurality of priority orders, each of the plurality of priority orders comprising a priority order of secondary codebooks associated with a different one of the plurality of codebooks as the primary codebook.

In one aspect, receiving the priority order, at 1104, includes receiving a priority order rule and determining the priority order based on the priority order rule.

In one aspects, the priority order rule is based on a number of CSI-RS ports associated each of the plurality of codebooks.

In one aspect, the priority order of each of the plurality of codebooks is based on whether the codebook is for wideband CSI or subband CSI.

Method 1100 then proceeds to step 1106 with reporting CSI based on the CSI report configuration and the priority order.

In one aspect, reporting the CSI based on the CSI report configuration and the priority order, at 1106, determining a PUCCH resource is insufficient to transmit CSI for the plurality of codebooks, at 1108, and dropping CSI for one or more codebooks based on the priority order at 1110.

In one aspect, reporting the CSI based on the CSI report configuration and the priority order, at 1106, includes determining a PUCCH resource is insufficient to transmit CSI for the plurality of codebooks and dropping CSI for all of the secondary codebooks.

Figure 13:
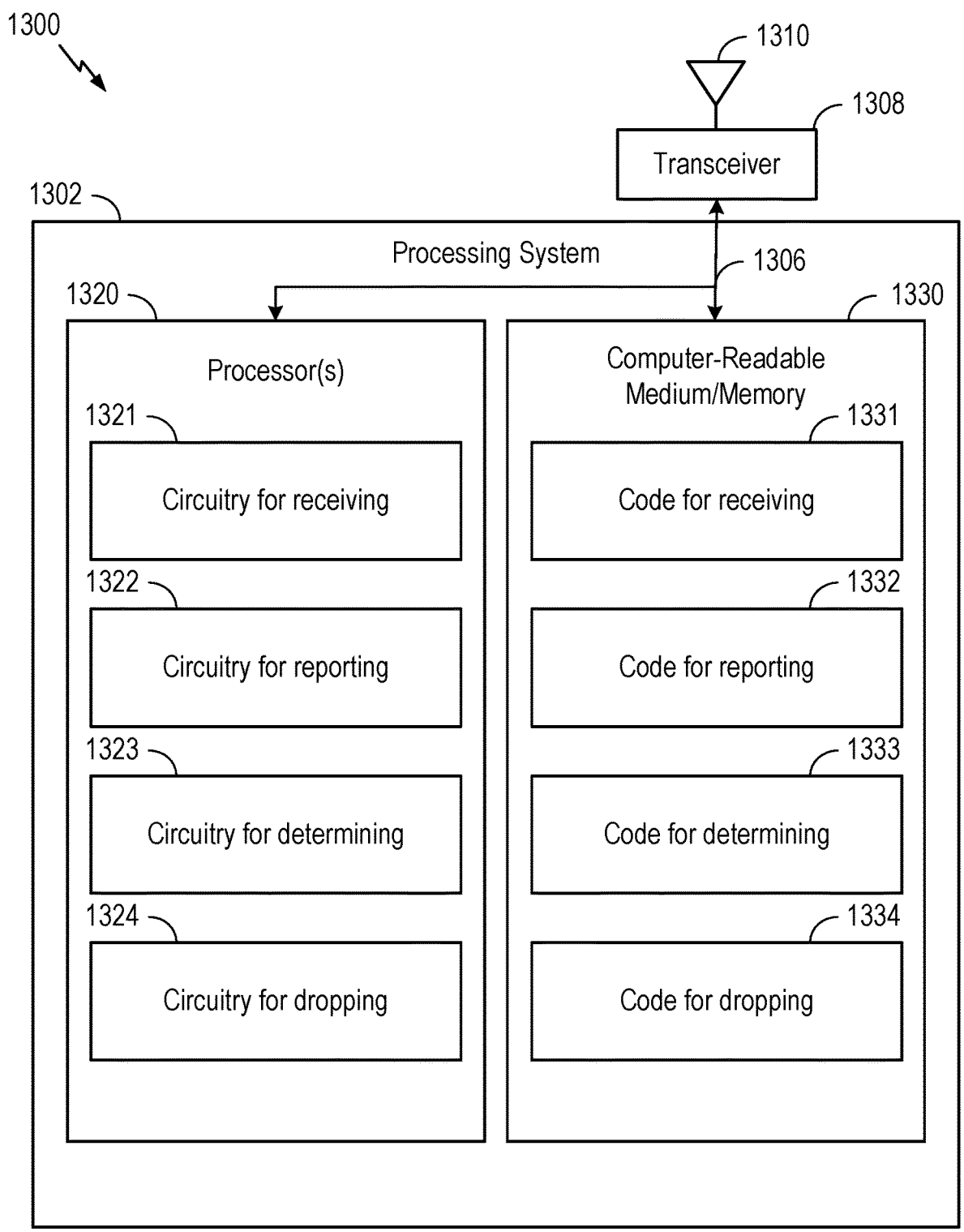
FIG. 13 depicts aspects of an example communications device.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Example Operations of a Network Entity

Figure 12:
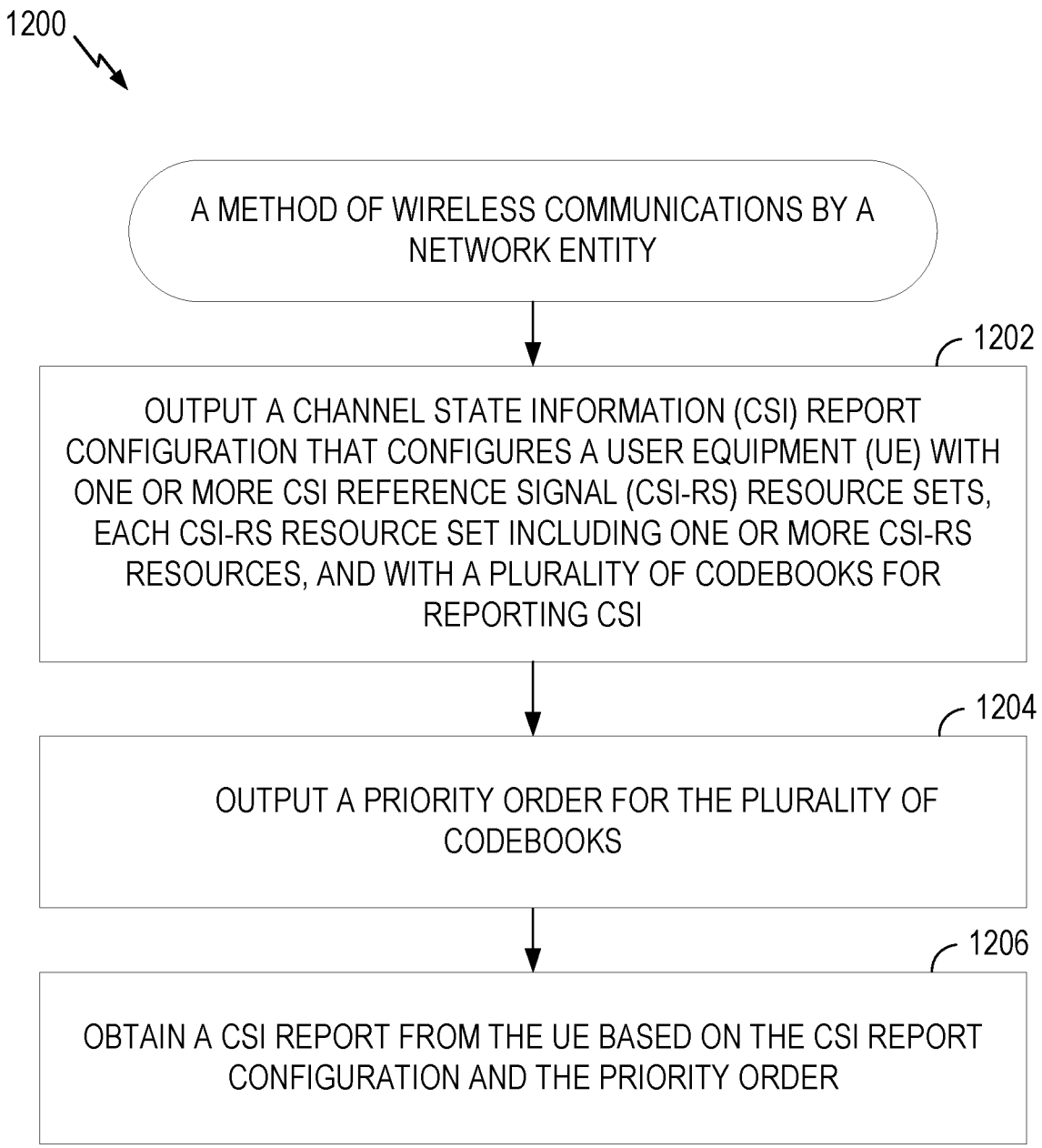
FIG. 12 depicts an example method for wireless communications by a network entity.

FIG. 12 shows a method 1200 for wireless communications by a network entity, such as BS 102 of FIGS. 1 and 3, or a disaggregated base station as discussed with respect to FIG. 2.

Method 1200 begins at 1202 with outputting a CSI report configuration that configures a UE with one or more CSI-RS resource sets. Each CSI-RS resource set includes one or more CSI-RS resources. The CSI report configuration also configures the UE with a plurality of codebooks for reporting CSI.

In one aspect, herein each codebook of the plurality of codebooks indicates one or more of: a number of CSI-RS antenna ports per CSI-RS resource, a number of antenna panels, a number of horizontal antenna elements of an antenna panel, a number of vertical antenna elements of an antenna panel, or a combination thereof.

Method 1200 then proceeds to step 1204 with outputting a priority order for the plurality of codebooks.

In one aspect, outputting the priority order, at 1204, includes outputting the priority order via radio resource control (RRC) signaling.

In one aspect, outputting the priority order, at 1204, includes outputting the priority order with the CSI report configuration.

In one aspect, outputting the priority order, at 1204, includes outputting an explicit indication of a priority level of each of the plurality of codebooks.

In one aspect, outputting the priority order, at 1204, includes outputting an indication of one of the plurality of codebooks as a primary codebook.

In one aspect, method 1200 further includes outputting an indication that the other codebooks of the plurality of codebooks are secondary codebooks and outputting an indication that the primary codebook is associated with a higher priority than the secondary codebooks.

In one aspect, outputting the priority order, at 1204, includes outputting a priority order of the other codebooks of the plurality of codebooks.

In one aspect, outputting the priority order of the other codebooks includes outputting a configuration of a priority order of the plurality of codebooks. The primary codebook is a highest priority codebook regardless of the configuration of the priority order.

In one aspect, outputting the priority order of the other codebooks includes outputting a plurality of priority orders, each of the plurality of priority orders comprising a priority order of secondary codebooks associated with a different one of the plurality of codebooks as the primary codebook.

In one aspect, outputting the priority order, at 1204, includes outputting a priority order rule.

In one aspect, the priority order rule is based on a number of CSI-RS ports associated each of the plurality of codebooks.

In one aspect, the priority order of each of the plurality of codebooks is based on whether the codebook is for wideband CSI or subband CSI.

Method 1200 then proceeds to step 1206 with obtaining a CSI report from the UE based on the CSI report configuration and the priority order.

Figure 14:
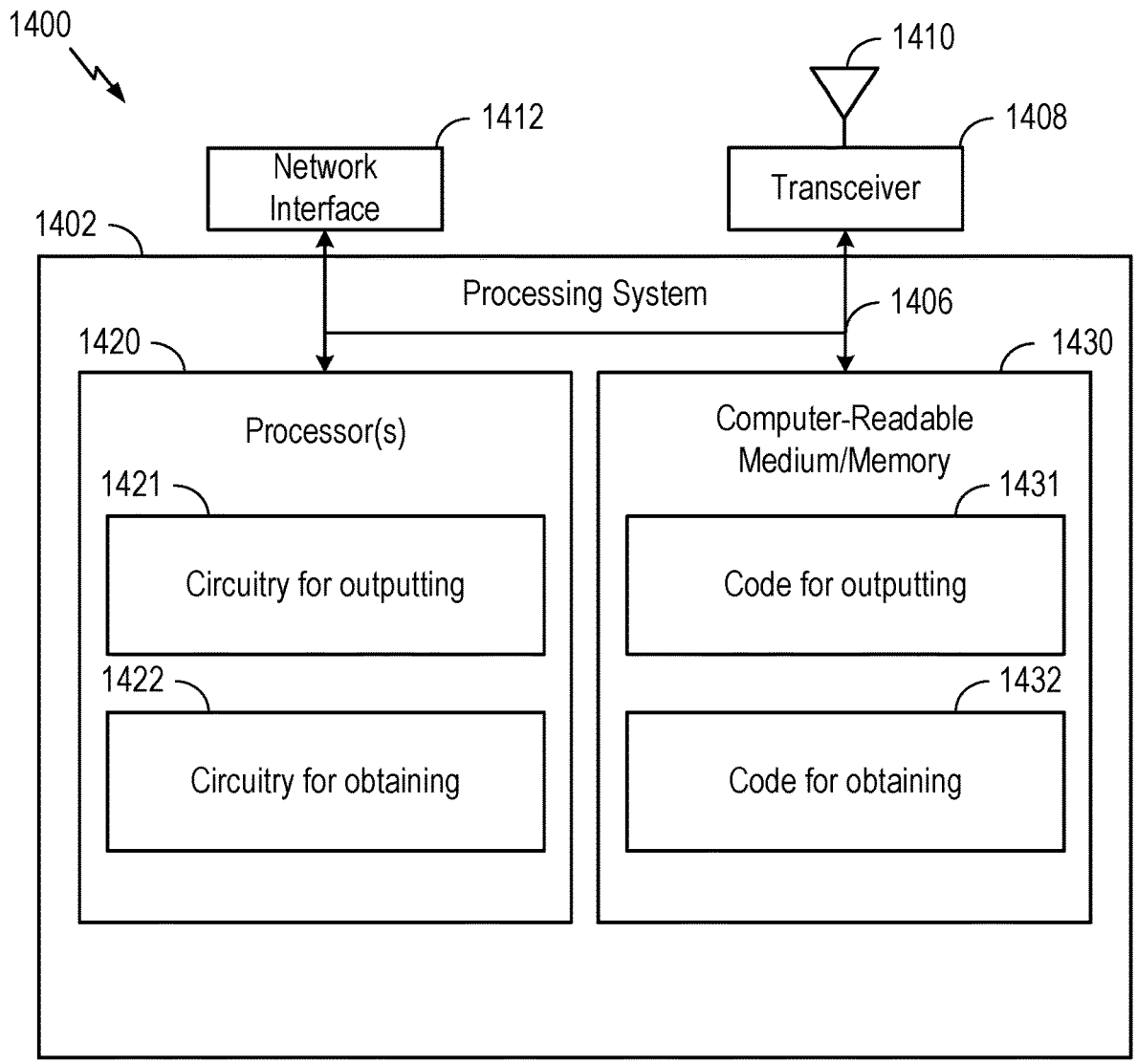
FIG. 14 depicts aspects of an example communications device.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Example Communications Devices

FIG. 13 depicts aspects of an example communications device 1300. In some aspects, communications device 1300 is a user equipment, such as UE 104 described above with respect to FIGS. 1 and 3.

The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes one or more processors 1320. In various aspects, the one or more processors 1320 may be representative of one or more of receive processor 358, transmit processor 364, TX MIMO processor 366, and/or controller/processor 380, as described with respect to FIG. 3. The one or more processors 1320 are coupled to a computer-readable medium/memory 1330 via a bus 1306. In certain aspects, the computer-readable medium/memory 1330 is configured to store instructions (e.g., computer-executable code) that when executed by the one or more processors 1320, cause the one or more processors 1320 to perform the method 1100 described with respect to FIG. 11, or any aspect related to it. Note that reference to a processor performing a function of communications device 1300 may include one or more processors performing that function of communications device 1300.

In the depicted example, computer-readable medium/memory 1330 stores code (e.g., executable instructions) for receiving 1331, code for reporting 1332, code for determining 1333, and code for dropping 1334. Processing of the code 1331-1334 may cause the communications device 1300 to perform the method 1100 described with respect to FIG. 11, or any aspect related to it.

The one or more processors 1320 include circuitry configured to implement (e.g., execute) the code stored in the computer-readable medium/memory 1330, including circuitry for receiving 1321, circuitry for reporting 1322, circuitry for determining 1323, and circuitry for dropping 1324. Processing with circuitry 1321-1324 may cause the communications device 1300 to perform the method 1100 described with respect to FIG. 11, or any aspect related to it.

Various components of the communications device 1300 may provide means for performing the method 1100 described with respect to FIG. 11, or any aspect related to it. For example, means for transmitting, sending or outputting for transmission may include the transceivers 354 and/or antenna(s) 352 of the UE 104 illustrated in FIG. 3 and/or transceiver 1308 and antenna 1310 of the communications device 1300 in FIG. 13. Means for receiving or obtaining may include the transceivers 354 and/or antenna(s) 352 of the UE 104 illustrated in FIG. 3 and/or transceiver 1308 and antenna 1310 of the communications device 1300 in FIG. 13.

FIG. 14 depicts aspects of an example communications device. In some aspects, communications device 1400 is a network entity, such as BS 102 of FIGS. 1 and 3, or a disaggregated base station as discussed with respect to FIG. 2.

The communications device 1400 includes a processing system 1402 coupled to a transceiver 1408 (e.g., a transmitter and/or a receiver) and/or a network interface 1412. The transceiver 1408 is configured to transmit and receive signals for the communications device 1400 via an antenna 1410, such as the various signals as described herein. The network interface 1412 is configured to obtain and send signals for the communications device 1400 via communications link(s), such as a backhaul link, midhaul link, and/or fronthaul link as described herein, such as with respect to FIG. 2. The processing system 1402 may be configured to perform processing functions for the communications device 1400, including processing signals received and/or to be transmitted by the communications device 1400.

The processing system 1402 includes one or more processors 1420. In various aspects, one or more processors 1420 may be representative of one or more of receive processor 338, transmit processor 320, TX MIMO processor 330, and/or controller/processor 340, as described with respect to FIG. 3. The one or more processors 1420 are coupled to a computer-readable medium/memory 1430 via a bus 1406. In certain aspects, the computer-readable medium/memory 1430 is configured to store instructions (e.g., computer-executable code) that when executed by the one or more processors 1420, cause the one or more processors 1420 to perform the method 1200 described with respect to FIG. 12, or any aspect related to it. Note that reference to a processor of communications device 1400 performing a function may include one or more processors of communications device 1400 performing that function.

In the depicted example, the computer-readable medium/memory 1430 stores code (e.g., executable instructions) for outputting 1431 and code for obtaining 1432. Processing of the code 1431-1432 may cause the communications device 1400 to perform the method 1200 described with respect to FIG. 12, or any aspect related to it.

The one or more processors 1420 include circuitry configured to implement (e.g., execute) the code stored in the computer-readable medium/memory 1430, including circuitry for outputting 1421 and circuitry for obtaining 1422. Processing with circuitry 1421-1422 may cause the communications device 1400 to perform the method 1200 as described with respect to FIG. 12, or any aspect related to it.

Various components of the communications device 1400 may provide means for performing the method 1200 as described with respect to FIG. 12, or any aspect related to it. Means for transmitting, sending or outputting for transmission may include the transceivers 332 and/or antenna(s) 334 of the BS 102 illustrated in FIG. 3 and/or transceiver 1408 and antenna 1410 of the communications device 1400 in FIG. 14. Means for receiving or obtaining may include the transceivers 332 and/or antenna(s) 334 of the BS 102 illustrated in FIG. 3 and/or transceiver 1408 and antenna 1410 of the communications device 1400 in FIG. 14.

Example Clauses

Implementation examples are described in the following numbered clauses:

Clause 1: A method of wireless communications by a user equipment (UE), comprising: receiving a channel state information (CSI) report configuration that configures one or more CSI reference signal (CSI-RS) resource sets, each CSI-RS resource set including one or more CSI-RS resources, and a plurality of codebooks for reporting CSI; receiving a priority order for the plurality of codebooks; and reporting CSI based on the CSI report configuration and the priority order.

Clause 2: The method of Clause 1, wherein receiving the priority order comprises receiving the priority order via radio resource control (RRC) signaling.

Clause 3: The method of any one or more of Clauses 1-2, wherein receiving the priority order comprises receiving the priority order with the CSI report configuration.

Clause 4: The method of any one or more of Clauses 1-3, wherein each codebook of the plurality of codebooks indicates one or more of: a number of CSI-RS antenna ports per CSI-RS resource, a number of antenna panels, a number of horizontal antenna elements of an antenna panel, a number of vertical antenna elements of an antenna panel, or a combination thereof.

Clause 5: The method of any one or more of Clauses 1-4, wherein reporting the CSI based on the CSI report configuration and the priority order comprises: determining a physical uplink control channel (PUCCH) resource is insufficient to transmit CSI for the plurality of codebooks; and dropping CSI for one or more codebooks based on the priority order.

Clause 6: The method of any one or more of Clauses 1-5, wherein receiving the priority order comprises receiving an explicit indication of a priority level of each of the plurality of codebooks.

Clause 7: The method of any one or more of Clauses 1-6, wherein receiving the priority order comprises receiving an indication of one of the plurality of codebooks as a primary codebook.

Clause 8: The method of Clause 7, further comprising: determining the other codebooks of the plurality of codebooks as secondary codebooks; and determining the primary codebook is associated with a higher priority than the secondary codebooks.

Clause 9: The method of Clause 8, wherein reporting the CSI based on the CSI report configuration and the priority order comprises: determining a physical uplink control channel (PUCCH) resource is insufficient to transmit CSI for the plurality of codebooks; and dropping CSI for all of the secondary codebooks.

Clause 10: The method of any one or more of Clauses 8-9, wherein receiving the priority order further comprises receiving a priority order of the secondary codebooks.

Clause 11: The method of Clause 10, wherein receiving the priority order of the secondary codebooks comprises: receiving a configuration of a priority order of the plurality of codebooks; determining the primary codebook as a highest priority codebook regardless of the configuration of the priority order; and determining the priority of the secondary codebooks according to the configuration of the priority order.

Clause 12: The method of any one or more of Clauses 10-11, wherein receiving the priority order of the secondary codebooks comprises: receiving a plurality of priority orders, each of the plurality of priority orders comprising a priority order of secondary codebooks associated with a different one of the plurality of codebooks as the primary codebook.

Clause 13: The method of any one or more of Clauses 1-12, wherein receiving the priority order comprises: receiving a priority order rule; and determining the priority order based on the priority order rule.

Clause 14: The method of Clause 13, wherein the priority order rule is based on a number of CSI-RS ports associated each of the plurality of codebooks.

Clause 15: The method of any one or more of Clauses 1-14, wherein the priority order of each of the plurality of codebooks is based on whether the codebook is for wideband CSI or subband CSI.

Clause 16: A method of wireless communications by a network entity, comprising: outputting a channel state information (CSI) report configuration that configures a user equipment (UE) with one or more CSI reference signal (CSI-RS) resource sets, each CSI-RS resource set including one or more CSI-RS resources, and with a plurality of codebooks for reporting CSI; outputting a priority order for the plurality of codebooks; and obtaining a CSI report from the UE based on the CSI report configuration and the priority order.

Clause 17: The method of Clause 16, wherein outputting the priority order comprises outputting the priority order via radio resource control (RRC) signaling.

Clause 18: The method of any one or more of Clauses 16-17, wherein outputting the priority order comprises outputting the priority order with the CSI report configuration.

Clause 19: The method of any one or more of Clauses 16-18, wherein each codebook of the plurality of codebooks indicates one or more of: a number of CSI-RS antenna ports per CSI-RS resource, a number of antenna panels, a number of horizontal antenna elements of an antenna panel, a number of vertical antenna elements of an antenna panel, or a combination thereof.

Clause 20: The method of any one or more of Clauses 16-19, wherein outputting the priority order comprises outputting an explicit indication of a priority level of each of the plurality of codebooks.

Clause 21: The method of any one or more of Clauses 16-20, wherein outputting the priority order comprises outputting an indication of one of the plurality of codebooks as a primary codebook.

Clause 22: The method of Clause 21, further comprising: outputting an indication that the other codebooks of the plurality of codebooks are secondary codebooks; and outputting an indication that the primary codebook is associated with a higher priority than the secondary codebooks.

Clause 23: The method of any one or more of Clauses 21-22, wherein outputting the priority order further comprises outputting a priority order of the other codebooks of the plurality of codebooks.

Clause 24: The method of Clause 23, wherein outputting the priority order of the other codebooks comprises: outputting a configuration of a priority order of the plurality of codebooks, wherein the primary codebook is a highest priority codebook regardless of the configuration of the priority order.

Clause 25: The method of any one or more of Clauses 23-24, wherein outputting the priority order of the other codebooks comprises: outputting a plurality of priority orders, each of the plurality of priority orders comprising a priority order of secondary codebooks associated with a different one of the plurality of codebooks as the primary codebook.

Clause 26: The method of any one or more of Clauses 16-25, wherein outputting the priority order comprises outputting a priority order rule.

Clause 27: The method of Clause 26, wherein the priority order rule is based on a number of CSI-RS ports associated each of the plurality of codebooks.

Clause 28: The method of any one or more of Clauses 16-27, wherein the priority order of each of the plurality of codebooks is based on whether the codebook is for wideband CSI or subband CSI.

Clause 29: An apparatus, comprising: a memory comprising executable instructions; and a processor configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by a processor of an apparatus, cause the apparatus to perform a method in accordance with any one of Clauses 1-28.

Clause 32: A computer program product embodied on a computer-readable storage medium comprising code for performing a method in accordance with any one of Clauses 1-28.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communications by a user equipment (UE), the method comprising:
   receiving radio resource control (RRC) signaling configuring a channel state information (CSI) report configuration that configures one or more CSI reference signal (CSI-RS) resource sets, each CSI-RS resource set including one or more CSI-RS resources, and a plurality of codebooks for reporting CSI;
   receiving, with the CSI report configuration, a priority order for the plurality of codebooks for reporting the CSI; and
   reporting the CSI based on the CSI report configuration and the priority order, wherein the reporting the CSI based on the CSI report configuration and the priority order comprises dropping the CSI for one or more codebooks, of the plurality of codebooks, based on the priority order.

2. The method of claim 1, wherein each codebook of the plurality of codebooks indicates one or more of: a number of CSI-RS antenna ports per CSI-RS resource, a number of antenna panels, a number of horizontal antenna elements of an antenna panel, a number of vertical antenna elements of an antenna panel, or a combination thereof.

3. The method of claim 1, further comprising determining a physical uplink control channel (PUCCH) resource is insufficient to transmit the CSI for the plurality of codebooks, wherein the dropping the CSI for the one or more codebooks, of the plurality of codebooks, based on the priority order is in response to the determination.

4. The method of claim 1, wherein the receiving the priority order comprises receiving an explicit indication of a priority level of each of the plurality of codebooks.

5. The method of claim 1, wherein the receiving the priority order comprises receiving an indication of one of the plurality of codebooks as a primary codebook.

6. The method of claim 5, further comprising:
   determining the other codebooks of the plurality of codebooks as secondary codebooks; and
   determining the primary codebook is associated with a higher priority than the secondary codebooks.

7. The method of claim 6, wherein the reporting the CSI based on the CSI report configuration and the priority order comprises:
   determining a physical uplink control channel (PUCCH) resource is insufficient to transmit the CSI for the plurality of codebooks; and
   dropping the CSI for all of the secondary codebooks.

8. The method of claim 6, wherein the receiving the priority order further comprises receiving a priority order of the secondary codebooks.

9. The method of claim 8, further comprising:
   determining the primary codebook as a highest priority codebook regardless of the configuration of the received priority order; and
   determining the priority of the secondary codebooks according to the received priority order.

10. The method of claim 8, wherein the receiving the priority order of the secondary codebooks comprises receiving a plurality of priority orders, each of the plurality of priority orders comprising a priority order of the secondary codebooks, and each of the plurality of priority orders being associated with a different one of the plurality of codebooks as the primary codebook.

11. The method of claim 1, wherein the receiving the priority order comprises:
   receiving a priority order rule; and
   determining the priority order based on the priority order rule.

12. The method of claim 11, wherein the priority order rule is based on a number of CSI-RS ports associated with each of the plurality of codebooks.

13. The method of claim 1, wherein the priority order of each of the plurality of codebooks is based on whether the codebook is for wideband CSI or subband CSI.

14. A method of wireless communications by a network entity, the method comprising:
   outputting radio resource control (RRC) signaling configuring a channel state information (CSI) report configuration that configures a user equipment (UE) with one or more CSI reference signal (CSI-RS) resource sets, each CSI-RS resource set including one or more CSI-RS resources, and with a plurality of codebooks for reporting CSI;

outputting, with the CSI report configuration, a priority order for the plurality of codebooks for reporting the CSI, wherein the priority order indicates an order for dropping CSI for a codebook, of the plurality of codebooks, associated with a lower priority before dropping CSI for codebooks, of the plurality of codebooks, associated with higher priority; and obtaining a CSI report from the UE based on the CSI report configuration and the priority order.

15. The method of claim 14, wherein each codebook of the plurality of codebooks indicates one or more of: a number of CSI-RS antenna ports per CSI-RS resource, a number of antenna panels, a number of horizontal antenna elements of an antenna panel, a number of vertical antenna elements of an antenna panel, or a combination thereof.

16. The method of claim 14, wherein the outputting the priority order comprises outputting an explicit indication of a priority level of each of the plurality of codebooks.

17. The method of claim 14, wherein the outputting the priority order comprises outputting an indication of one of the plurality of codebooks as a primary codebook.

18. The method of claim 17, wherein the outputting the priority further comprises:

outputting an indication that the other codebooks of the plurality of codebooks are secondary codebooks; and outputting an indication that the primary codebook is associated with a higher priority than the secondary codebooks.

19. The method of claim 17, wherein the outputting the priority order further comprises outputting a priority order of the other codebooks of the plurality of codebooks.

20. The method of claim 19, wherein the outputting the priority order of the other codebooks comprises outputting a configuration of a priority order of the plurality of codebooks, wherein the primary codebook is a highest priority codebook regardless of the configuration of the priority order.

21. The method of claim 19, wherein the outputting the priority order of the other codebooks comprises outputting a plurality of priority orders, each of the plurality of priority orders comprising a priority order of the other codebooks, and each of the plurality of priority orders being associated with a different one of the plurality of codebooks as the primary codebook.

22. The method of claim 14, wherein the outputting the priority order comprises outputting a priority order rule.

23. The method of claim 22, wherein the priority order rule is based on a number of CSI-RS ports associated each of the plurality of codebooks.

24. The method of claim 14, wherein the priority order of each of the plurality of codebooks is based on whether the codebook is for wideband CSI or subband CSI.

25. A user equipment (UE) configured for wireless communications, the UE comprising:

memory comprising computer-executable instructions; and one or more processors configured to, individually or collectively, execute the computer-executable instructions and cause the UE to:

receive radio resource control (RRC) signaling configuring a channel state information (CSI) report configuration that configures one or more CSI reference signal (CSI-RS) resource sets, each CSI-RS resource set including one or more CSI-RS resources, and a plurality of codebooks for reporting CSI;

receive, with the CSI report configuration, a priority order for the plurality of codebooks for reporting the CSI; and report the CSI based on the CSI report configuration and the priority order, wherein the reporting the CSI based on the CSI report configuration and the priority order comprises dropping the CSI for one or more codebooks, of the plurality of codebooks, based on the priority order.

26. A network entity configured for wireless communications, the network entity comprising:

memory comprising computer-executable instructions; and one or more processors configured to, individually or collectively, execute the computer-executable instructions and cause the network entity to:

output radio resource control (RRC) signaling configuring a channel state information (CSI) report configuration that configures a user equipment (UE) with one or more CSI reference signal (CSI-RS) resource sets, each CSI-RS resource set including one or more CSI-RS resources, and with a plurality of codebooks for reporting CSI;

output, with the CSI report configuration, a priority order for the plurality of codebooks for reporting the CSI, wherein the priority order indicates an order for dropping CSI for a codebook, of the plurality of codebooks, associated with a lower priority before dropping CSI for codebooks, of the plurality of codebooks, associated with higher priority; and obtain a CSI report from the UE based on the CSI report configuration and the priority order.

* * * * *